US009459277B2

(12) United States Patent
Hergesheimer et al.

(10) Patent No.: US 9,459,277 B2
(45) Date of Patent: *Oct. 4, 2016

(54) SYSTEMS AND METHODS FOR 3-AXIS ACCELEROMETER CALIBRATION WITH VERTICAL SAMPLE BUFFERS

(71) Applicant: CALAMP CORP., Oxnard, CA (US)

(72) Inventors: Peter Hergesheimer, Encinitas, CA (US); Todd Sprague, Placerville, CA (US); Alexandre Dlagnekov, Escondido, CA (US)

(73) Assignee: CalAmp Corp., Irvine, CA (US)

( * ) Notice: Subject to any disclaimer, the term of this patent is extended or adjusted under 35 U.S.C. 154(b) by 614 days.

This patent is subject to a terminal disclaimer.

(21) Appl. No.: 13/770,920

(22) Filed: Feb. 19, 2013

(65) Prior Publication Data

US 2014/0236519 A1 Aug. 21, 2014

(51) Int. Cl.
  *G01M 17/00* (2006.01)
  *G06F 7/00* (2006.01)
  *G06F 19/00* (2011.01)
  *G01P 21/00* (2006.01)
  *G01P 15/18* (2013.01)

(52) U.S. Cl.
  CPC .............. *G01P 21/00* (2013.01); *G01P 15/18* (2013.01)

(58) Field of Classification Search
  None
  See application file for complete search history.

(56) References Cited

U.S. PATENT DOCUMENTS 5,117,375 A    5/1992  Worcester
5,862,511 A *  1/1999  Croyle .................. G01C 21/28
                                                      701/445

(Continued)

FOREIGN PATENT DOCUMENTS

WO    0017607    3/2000
WO    0218873    3/2002

(Continued)

OTHER PUBLICATIONS

International Search Report and Written Opinion for International Application No. PCT/US13/54939, International Filing Date Aug. 14, 2013, Search Completed Feb. 5, 2014, Mailed Feb. 24, 2014, 5 pgs.

(Continued)

*Primary Examiner* — Yonel Beaulieu
*Assistant Examiner* — Lail Kleinman
(74) *Attorney, Agent, or Firm* — KPPB LLP

(57) ABSTRACT

Systems and methods for the calibration of 3-axis accelerometers using vertical sample buffers in accordance embodiments of the invention are disclosed. In one embodiment, a telematics system includes a processor, an acceleration sensor, a velocity sensor, and a memory configured to store an acceleration alignment application, wherein the acceleration alignment application configures the processor to receive a velocity information sample using the velocity sensor, determine vehicular acceleration information along at least one vehicle axes using the velocity information sample, receive at least one acceleration sensor acceleration information sample using the acceleration sensor, determine a plurality of vertical vector samples using the vehicular acceleration information, calculate an average vertical vector sample using at least one of the vertical vector samples, and calibrate at least one of the vehicle axes to an acceleration sensor axis using the vehicular acceleration information, the acceleration sensor acceleration sample, and the average vertical vector sample.

20 Claims, 8 Drawing Sheets

(56) References Cited

U.S. PATENT DOCUMENTS

| | | |
|---|---|---|
| 6,029,111 A | 2/2000 | Croyle |
| 6,076,028 A | 6/2000 | Donnelly et al. |
| 6,417,802 B1 * | 7/2002 | Diesel .................... G01S 19/26 342/357.31 |
| 6,532,419 B1 | 3/2003 | Begin |
| 2002/0100310 A1 | 8/2002 | Begin |
| 2008/0202199 A1 | 8/2008 | Finley |
| 2009/0217733 A1 | 9/2009 | Stachow et al. |
| 2010/0039318 A1 | 2/2010 | Kmiecik |
| 2010/0097316 A1 | 4/2010 | Shaw |
| 2010/0312473 A1 | 12/2010 | Hoshizaki |
| 2010/0318257 A1 | 12/2010 | Kalinadhabhotla |
| 2011/0153367 A1 | 6/2011 | Amigo |
| 2011/0202225 A1 * | 8/2011 | Willis .................. G01C 21/165 701/31.4 |
| 2011/0264393 A1 | 10/2011 | An et al. |
| 2012/0022780 A1 | 1/2012 | Kulik et al. |
| 2012/0050095 A1 | 3/2012 | Scherzinger et al. |
| 2012/0253585 A1 * | 10/2012 | Harvie .................. G07C 5/085 701/29.1 |
| 2012/0259526 A1 | 10/2012 | Inoue et al. |
| 2013/0073142 A1 | 3/2013 | Hergesheimer et al. |
| 2014/0236518 A1 | 8/2014 | Hergesheimer et al. |

FOREIGN PATENT DOCUMENTS

| | | |
|---|---|---|
| WO | 2014130077 A1 | 8/2014 |
| WO | 2014130078 A1 | 8/2014 |

OTHER PUBLICATIONS

International Search Report and Written Opinion for International Application No. PCT/US13/54943, International Filing Date Aug. 14, 2013, Search Completed Feb. 13, 2014, Mailed Feb. 27, 2014, 6 pgs.

International Preliminary Report on Patentability for International Application PCT/US2013/054939, Report Issued Aug. 25, 2015, Mailed Sep. 3, 2015, 4 Pgs.

International Preliminary Report on Patentability for International Application PCT/US2013/054943, Report Issued Aug. 25, 2015, Mailed Sep. 3, 2015, 6 Pgs.

* cited by examiner

SYSTEMS AND METHODS FOR 3-AXIS ACCELEROMETER CALIBRATION WITH VERTICAL SAMPLE BUFFERS

FIELD OF THE INVENTION

The present invention is generally related to calibrating the alignment of a 3-axis accelerometer and more specifically to the calibration of 3-axis accelerometers using vertical sample buffers to align with a vehicle's axis for accurate vehicle acceleration data.

BACKGROUND OF THE INVENTION

A Global Positioning System (GPS) is a space based global navigation satellite system that utilizes a network of geo-synchronous satellites that can be utilized by a GPS receiver to determine its location. Many telematics systems incorporate a Global Positioning System (GPS) receiver, which can be used to obtain the location of a vehicle at a certain measured time. Using the signals received by the GPS receiver, the heading information of the vehicle can be determined. A GPS receiver can determine velocity information in a variety of ways including, but not limited to, measuring the Doppler shift of the received signals and by comparing the location of a vehicle at a plurality of measured times. The acceleration of the vehicle can be determined as the change in speed divided by the time between the measurements. A GPS receiver's ability to determine acceleration can be limited due to the dependence of the measurement upon factors such as, but not limited to, reception and satellite availability. In addition to location information, a GPS receiver can also be configured to provide time data. However, measurements determined via a GPS receiver can contain errors that affect the accuracy of the measured information. In particular, GPS signals are vulnerable to signal delays, inconsistencies of atmospheric conditions that affect the speed of the GPS signals as they pass through the Earth's atmosphere, and multipath distortions. Additionally, other factors not listed above can influence GPS signals and result in measurement errors.

An accelerometer is a device that measures acceleration associated with the weight experienced by a test mass in the frame of reference of the accelerometer device. The acceleration measured by an accelerometer is therefore a weight per unit of test mass, or g-force. Thereby, a stationary accelerometer in a vehicle would experience the earth's gravity while a free falling one would not.

SUMMARY OF THE INVENTION

Systems and methods for calibrating the alignment of 3-axis accelerometers using vertical sample buffers in accordance embodiments of the invention are disclosed. In one embodiment of the invention, a telematics system includes a processor, an acceleration sensor connected to the processor and configured to determine acceleration information along one or more acceleration sensor axes, a velocity sensor connected to the processor and configured to determine velocity information along a vehicular forward axis and heading information, and a memory connected to the processor and configured to store an acceleration alignment application and a vertical sample buffer, where the vertical sample buffer is configured to store a number of vertical vector samples, wherein the acceleration alignment application configures the processor to receive a velocity information sample using the velocity sensor, determine vehicular acceleration information along at least one vehicle axes using the velocity information sample, receive at least one acceleration sensor acceleration information sample using the acceleration sensor, determine a plurality of vertical vector samples using the vehicular acceleration information, store at least one of the determined plurality of vertical vector samples using the vertical sample buffer, calculate an average vertical vector sample using at least one of the stored vertical vector samples, and calibrate at least one of the vehicle axes to an acceleration sensor axis in the at least one acceleration sensor axes using the vehicular acceleration information, the at least one acceleration sensor acceleration sample, and the average vertical vector sample.

In another embodiment of the invention, the vertical sample buffer is a circular buffer configured to store a fixed number of vertical vector samples.

In an additional embodiment of the invention, the acceleration alignment application further configures the processor to replace the oldest vertical vector sample stored in the vertical sample buffer once the fixed number of vertical vector samples have been stored using the vertical sample buffer.

In yet another additional embodiment of the invention, the acceleration alignment application further configures the processor to associate a vector sample metadata with a vector sample, where the vector sample metadata includes a timestamp.

In still another additional embodiment of the invention, the acceleration alignment application further configures the processor to associate axis calibration metadata with the at least one calibrated axes and recalibrate the calibrated vehicles axes using the acceleration sensor acceleration information samples, the vehicular acceleration sample, the stored at least one vertical vector sample, the vector sample metadata, and the axis calibration metadata.

In yet still another additional embodiment of the invention, the velocity sensor is a Global Positioning System (GPS) receiver having a GPS sampling rate, the velocity information determined using the GPS receiver is determined at the GPS sampling rate, each piece of velocity information determined using the GPS receiver has an associated velocity information error, where the velocity information error is a measure of the difference between the determined velocity information and the true velocity information, and the acceleration alignment application configures the processor to calculate the average vertical vector sample to compensate for the velocity information errors.

In yet another embodiment of the invention, the acceleration alignment application further configures the processor to calculate the average vertical vector sample once a number of vertical vector samples have been stored in the buffer.

In still another embodiment of the invention, the number of vertical vector samples is determined based on performance requirements of the telematics system.

In yet still another embodiment of the invention, the velocity sensor is configured to determine velocity information at a velocity sensor sample rate, the performance requirements of the telematics system are based a delay between the motion of the telematics system and the time the calibration of at least one of the vehicle axes to an acceleration sensor axis in the at least one acceleration sensor axes is completed, and the number of vertical vector samples utilized to determine the average vertical vector is based on the velocity sensor sample rate and the delay.

In yet another additional embodiment of the invention, the acceleration alignment application further configures the processor to determine an updated average vertical acceleration vector using the stored vertical vectors and the calibrated vehicle axes and recalibrate the calibrated vehicles axes using the using the acceleration sensor acceleration information samples, the vehicular acceleration sample, and the updated average vertical acceleration vector.

Still another embodiment of the invention includes a method for aligning a vehicle's axes using a telematics system, where the telematics system is mounted in a vehicle having one or more vehicle axes, including receiving at least one velocity information sample using a telematics system, determining vehicular acceleration information along at least one vehicle axes using velocity information sample and the telematics system, receiving at least one acceleration sensor acceleration information sample using the telematics system, determining a plurality of vertical vector samples using the vehicular acceleration information and the telematics system, storing at least one of the determined plurality of vertical vector samples using the telematics system, calculating an average vertical vector sample using at least one of the stored vertical vector samples and the telematics system, and calibrating at least one of the vehicle axes to an acceleration sensor axis in the at least one acceleration sensor axes based on the vehicular acceleration information, the at least one acceleration sensor acceleration sample, the average vertical vector sample using the telematics system.

In yet another additional embodiment of the invention, the telematics system is configured to store a fixed number of vertical vector samples.

In still another additional embodiment of the invention, aligning a vehicle's axes includes replacing the oldest stored vertical vector sample once the fixed number of vertical vector samples has been stored using the telematics system.

In yet still another additional embodiment of the invention, aligning a vehicle's axes includes associating vector sample metadata with a vertical vector sample using the telematics system, where the vector sample metadata includes a timestamp.

In yet another embodiment of the invention, aligning a vehicle's axes further includes associating axis calibration metadata with the at least one calibrated axes using the telematics system and recalibrating the calibrated vehicles axes based on the acceleration sensor acceleration information samples, the vehicular acceleration sample, the stored at least one vertical vector sample, the vector sample metadata, and the axis calibration metadata using the telematics system.

In still another embodiment of the invention, the telematics unit includes a Global Positioning System (GPS) receiver having a GPS sampling rate, the velocity information determined using the telematics system is determined at the GPS sampling rate, each piece of velocity information determined using the telematics system has an associated velocity information error, where the velocity information error is a measure of the difference between the determined velocity information and the true velocity information, and calculating the average vertical vector sample using the telematics system compensates for the velocity information errors.

In yet still another embodiment of the invention, aligning a vehicle's axes further includes calculating the average vertical vector sample using the telematics system once a number of vertical vector samples have been stored.

In yet another additional embodiment of the invention, the number of vertical vector samples is determined based on performance requirements of the telematics system.

In still another additional embodiment of the invention, aligning a vehicle's axes further includes calculating the number of vertical vector samples utilized in determining the average vertical vector based on a velocity sensor sample rate using the telematics system.

In yet still another additional embodiment of the invention, aligning a vehicle's axes further includes determining an updated average vertical acceleration vector based on the stored vertical vectors and the calibrated vehicle axes using the telematics system and recalibrating the calibrated vehicles axes based on the acceleration sensor information samples, the vehicular acceleration sample, and the updated average vertical acceleration vector using the telematics system.

DETAILED DESCRIPTION

Figure 1:
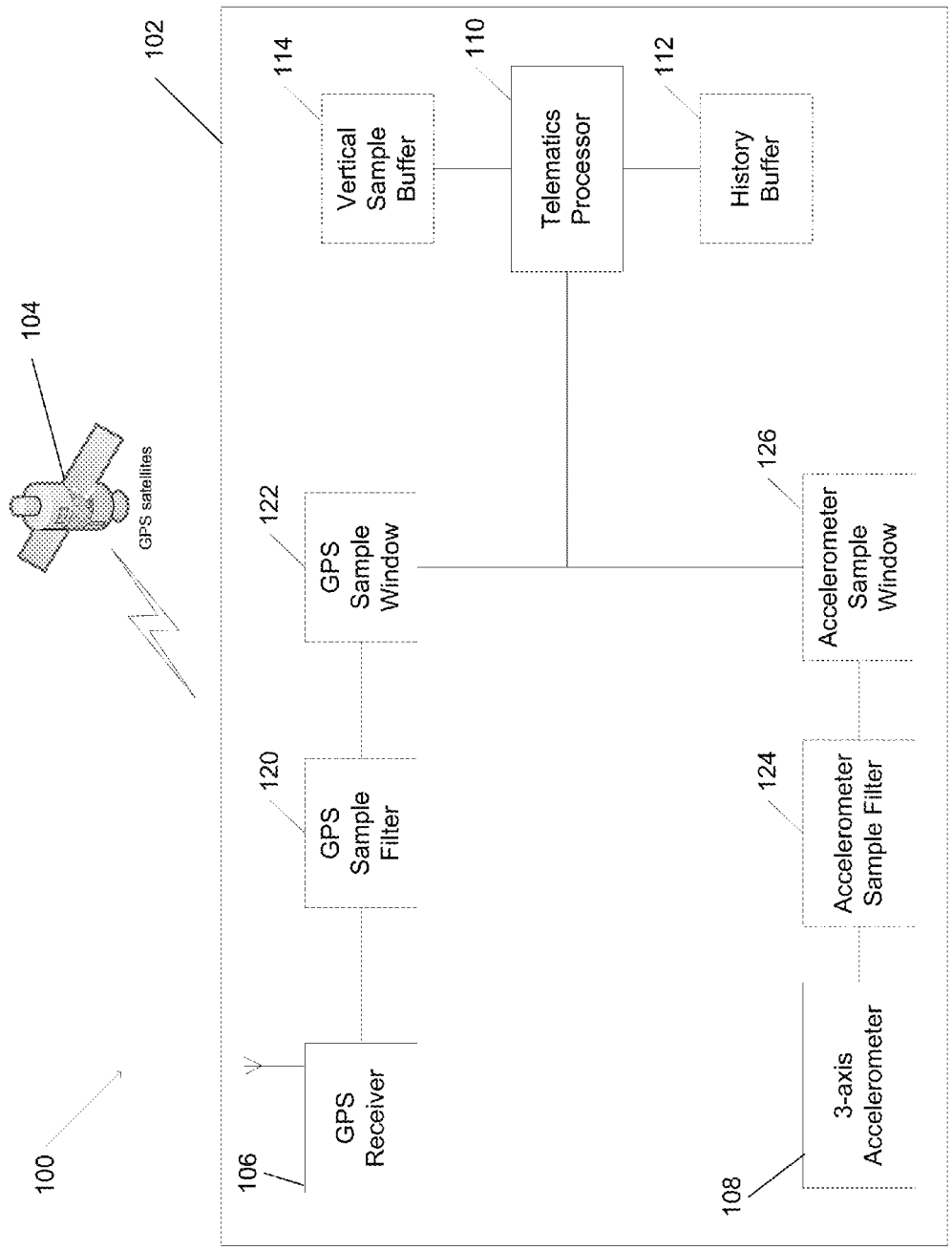
FIG. 1 illustrates a system for calibrating a 3-axis accelerometer with an accelerometer, GPS unit and telematics processor in accordance with an embodiment of the invention.

Turning now to the drawings, systems and methods for calibration of the alignment of 3-axis accelerometers using vertical sample buffers in accordance with embodiments of the invention are illustrated. Information concerning vehicle speed and acceleration can provide insights into driver behavior. For example, such information can indicate a variety of driver behaviors, including, but not limited to, performing hard cornering or suddenly stopping while driving. In accordance with many embodiments of the invention, vehicle speed can be calculated using information provided by a Global Position System (GPS) receiver by dividing the distance traveled by the GPS receiver by the time between measurements taken by the GPS receiver. The differences in vehicle speed between measurements taken by the GPS receiver can be used to determine acceleration information for the vehicle. However, the use of GPS data to calculate acceleration information is dependent upon a variety of factors, such as reception and satellite availability, which can present problems when calculating the acceleration information. In accordance with embodiments of the invention, a variety of devices configured to determine location and/or velocity information other than GPS receivers can be used.

Acceleration information for a vehicle can also be captured using an accelerometer or other device configured to determine acceleration information; these devices are often installed on a vehicle or mobile device. Accelerometers installed on a vehicle that are not accurately aligned with the vehicle axes limit the accuracy of the acceleration data captured by the accelerometer. In a number of embodiments, the accelerometer axes do not change relative to the vehicle axes. A 3-axis accelerometer is an accelerometer configured to determine acceleration in the X, Y, and Z axes, corresponding to the forward, lateral, and vertical vectors measured by the 3-axis accelerometer. Accurate accelerometer data aligned with the axes of the vehicle is beneficial in many applications, including, but not limited to, telematics. Telematics is the integrated use of telecommunications and informatics, including, but not limited to, monitoring vehicle movement and behavior.

In accordance with embodiments of the invention, a 3-axis accelerometer is calibrated to align with a vehicle's vertical, lateral, and forward axes using acceleration information and location information of the vehicle. In many embodiments, the location information is captured using a GPS receiver and the acceleration information is captured using the 3-axis accelerometer, although other devices capable of capturing location and/or acceleration information can be utilized in accordance with embodiments of the invention. These measurements can be taken based on an occurrence of certain events, in response to a request for calibration, and/or performed continuously. In many embodiments, acceleration and location information is measured when location information captured using the GPS receiver indicates that the vehicle is stationary. In several embodiments, acceleration and location information is measured when the location information captures using the GPS receiver indicates that the vehicle is in motion and/or that the vehicle is traveling over a certain speed. Data analysis, including filtering, can be utilized to filter useful data from erroneous or irrelevant measurements captured by the 3-axis accelerometer and/or GPS receiver and/or aligned data computed using the 3-axis accelerometer and/or GPS receiver data.

A vertical vector can be used for comparison between vertical acceleration detected by an accelerometer or from data captured using a GPS receiver. However, errors in the captured and/or detected data can result in the vertical vector providing an inaccurate measurement of the true motion of the vehicle. In many embodiments, vertical vectors are determined over discrete time intervals and averaged to compensate for measurement errors. The vertical vectors can be stored in a vertical sample buffer; a variety of vertical sample buffers can be utilized in accordance with embodiments of the invention, including circular buffers. In several embodiments, a moving average of the stored vertical vectors is utilized in aligning the accelerometer axes to the vehicle axes.

Systems and methods for calibrating a 3-axis accelerometer to align with the axes of a vehicle utilizing information captured using an accelerometer and/or a GPS receiver in accordance with embodiments of the invention are discussed further below.

Telematics System Architecture

Telematics systems are utilized in vehicles to determine and/or report the location and behavior of the vehicle. A telematics system containing a 3-axis accelerometer aligned to vehicle axes in accordance with an embodiment of the invention is illustrated in FIG. 1. The telematics system 100 includes a telematics unit 102, where the telematics unit 102 includes a GPS receiver 106, a 3-axis accelerometer 108, and a telematics process 110. The GPS receiver 106 and the 3-axis accelerometer 108 are configured to communicate with a telematics processor 110. The GPS receiver 106 is configured to receive signals from one or more GPS satellites 104, if available. In accordance with embodiments of the invention, the GPS receiver 106 and the 3-axis accelerometer 108 are configured to provide information to the telematics processor 110 at a sample rate; the GPS sample rate of the GPS receiver 106 and the accelerometer sample rate of the 3-axis accelerometer 108 are independent and determined dynamically or pre-determined.

In several embodiments, the GPS receiver 106 is configured to determine location information using signals received from a number of GPS satellites 104. In many embodiments, the GPS receiver 106 is configured to determine velocity and/or acceleration information using the received location information. In a number of embodiments, the GPS receiver is configured to determine velocity information by measuring the Doppler shift of the signals received from the GPS satellites 104. In a variety of embodiments, a vertical sample buffer 114 is utilized to store vertical vector samples; the stored vertical vector samples can be processed to compensate for errors in the received GPS information. In many embodiments, the 3-axis accelerometer 108 can generate 3-axis acceleration data from vehicle motion. In many embodiments, the telematics processor 110 is configured to calibrate the 3-axis accelerometer 108 to correlate the 3-axis acceleration data generated by the 3-axis accelerometer 108 to the axes of the vehicle in which the telematics system 100 is installed using velocity and/or acceleration information. In a number of embodiments, the telematics processor 110 is configured to determine velocity and/or acceleration information using location information received using the GPS receiver 106. In multiple embodiments, the telematics processor 110 utilizes acceleration and/or velocity information generated by the GPS receiver 106.

In several embodiments, the telematics unit 102 includes a GPS sample filter 120 and/or an accelerometer sample filter 124. The GPS sample filter 120 is configured to sample and convert the sampling rate of the GPS receiver 106. The accelerometer sample filter 124 is configured to sample and convert the sampling rate of the 3-axis accelerometer 108. In many embodiments, the GPS sample filter 120 and/or the accelerometer sample filter 124 are configured to match the GPS sampling rate to the accelerometer sampling rate. For example, if the GPS receiver 106 has a sampling rate of 250 milliseconds and the 3-axis accelerometer 108 has a sampling rate of 50 milliseconds, the accelerometer sample filter 124 can utilize five samples generated using the 3-axis accelerometer 108 to match the 250 millisecond sample rate of the GPS receiver 106. The accelerometer sample filter 124 and/or the GPS sample filter 120 perform the rate matching in a variety of ways, including, but not limited to, averaging information received, selecting the highest sample received, selecting the smallest sample received, selecting one sample at random, and/or selecting the last sample. In many embodiments, the accelerometer sample filter 124 and/or the GPS sample filter 120 are implemented using the telematics processor 110 and/or the history buffer 112. In a variety of embodiments, the sampling rates of the GPS receiver and the accelerometer do not need to be synchronized in order to calibrate the axes of the accelerometer with the vehicle axes.

In a number of embodiments, the telematics unit 102 includes a GPS sample window 122 configured to store one or more samples received using the GPS receiver 106. In several embodiments, the telematics unit 102 includes an accelerometer sample window 126 configured to store one or more samples received using the 3-axis accelerometer 108. In many embodiments, the telematics processor 110 can accumulate information provided by the GPS receiver 106 and the 3-axis accelerometer 108 along with calibration information using a history buffer 112. In several embodiments, the telematics processor 110 is configured to use the accumulated information to perform the calibration of the 3-axis accelerometer 108 to the vehicle axes. In a number of embodiments, the telematics processor 110 is configured to adapt the calibration of the 3-axis accelerometer 108 to the vehicle axes using the location and/or velocity information determined using the GPS receiver 106. In many embodiments, the GPS sample window 122, the accelerometer sample window 126, and/or the vertical sample buffer 114 is implemented using the telematics processor 110 and/or the history buffer 112.

A specific telematics system is described above; however, a variety of telematics systems, including those that receive location information without using a GPS receiver, can be utilized in accordance with embodiments of the invention. Processes for calibrating a 3-axis accelerometer relative to the axes of a vehicle to which the 3-axis accelerometer is installed are discussed further below.

Comparison of Accelerometer Axes and Vehicle Axes

Figure 2:
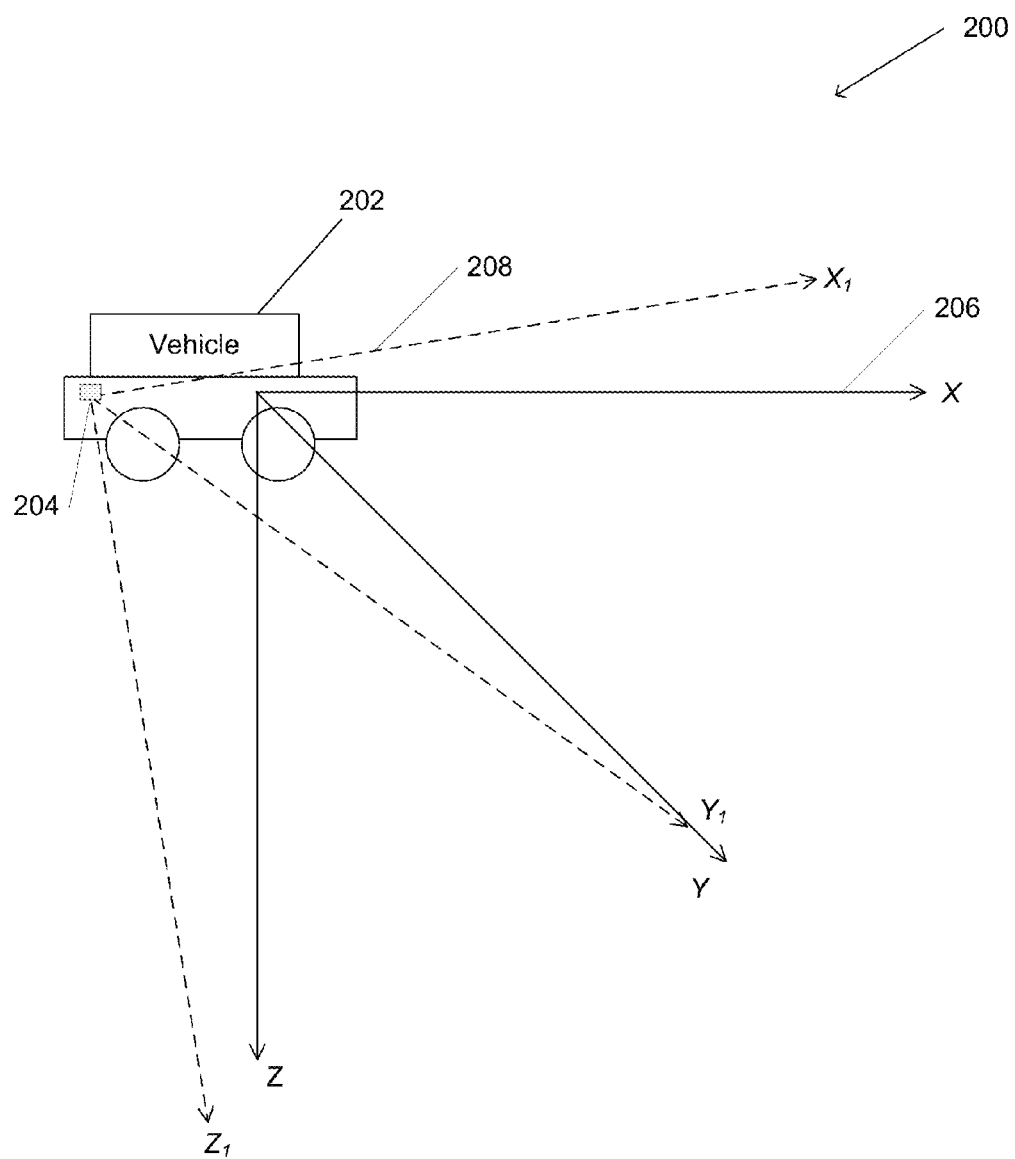
FIG. 2 illustrates the alignment of the axes of a 3-axis accelerometer to the axes of a vehicle in accordance with an embodiment of the invention.

In order to provide accurate acceleration information, a 3-axis accelerometer is calibrated to the axes of the vehicle in which the 3-axis accelerometer is installed. An illustration of the relative alignment of the axes of a 3-axis accelerometer to the axes of a vehicle in accordance with embodiments of the invention is shown in FIG. 2. Coordinate axes 200 show the relative alignment of the axes 208 of a 3-axis accelerometer 204 and the axes 206 of a vehicle 202 to which the accelerometer is mounted. The X, Y and Z coordinate axes 206 are the axes of a vehicle. The $X_1$, $Y_1$ and $Z_1$ axes are the axes 208 of the 3-axis accelerometer 204. In the illustrated embodiment, the axes 208 of the 3-axis accelerometer 204 are not aligned with the axes 206 of the vehicle 202. Therefore, in order to determine acceleration along the axes 206 of the vehicle, the 3-axis accelerometer's 204 axes 208 $X_1$, $Y_1$ and $Z_1$ are calibrated with respect to the axes 206 X, Y and Z of the vehicle 202; processes for performing this calibration are discussed in more detail below. In many embodiments of the invention, the axes 206 X, Y and Z of the vehicle 202 correspond to a gravity vector, a lateral directional vector of travel along a horizontal plane, and the orthogonal to the gravity vector and the lateral motion vector; accordingly, the calibration of the accelerometer's 204 axes 208 $X_1$, $Y_1$ and $Z_1$ are to the gravity vector, the lateral motion vector, and the orthogonal of the gravity vector and the lateral motion vector. In many embodiments, the 3-axis accelerometer 204 is part of a telematics system installed in the vehicle 202.

Although a specific relative alignment between the axes of a 3-axis accelerometer and a vehicle described above, a variety of alignments, including those where the axes of a 3-axis accelerometer are aligned to a gravity vector, a lateral motion vector, and the orthogonal of the gravity vector and the lateral motion vector, can be utilized in accordance with embodiments of the invention. Processes for calibrating 3-axis accelerometers in accordance with embodiments of the invention are described below.

3-Axis Accelerometer Calibration Using GPS Location Information

Figure 3:
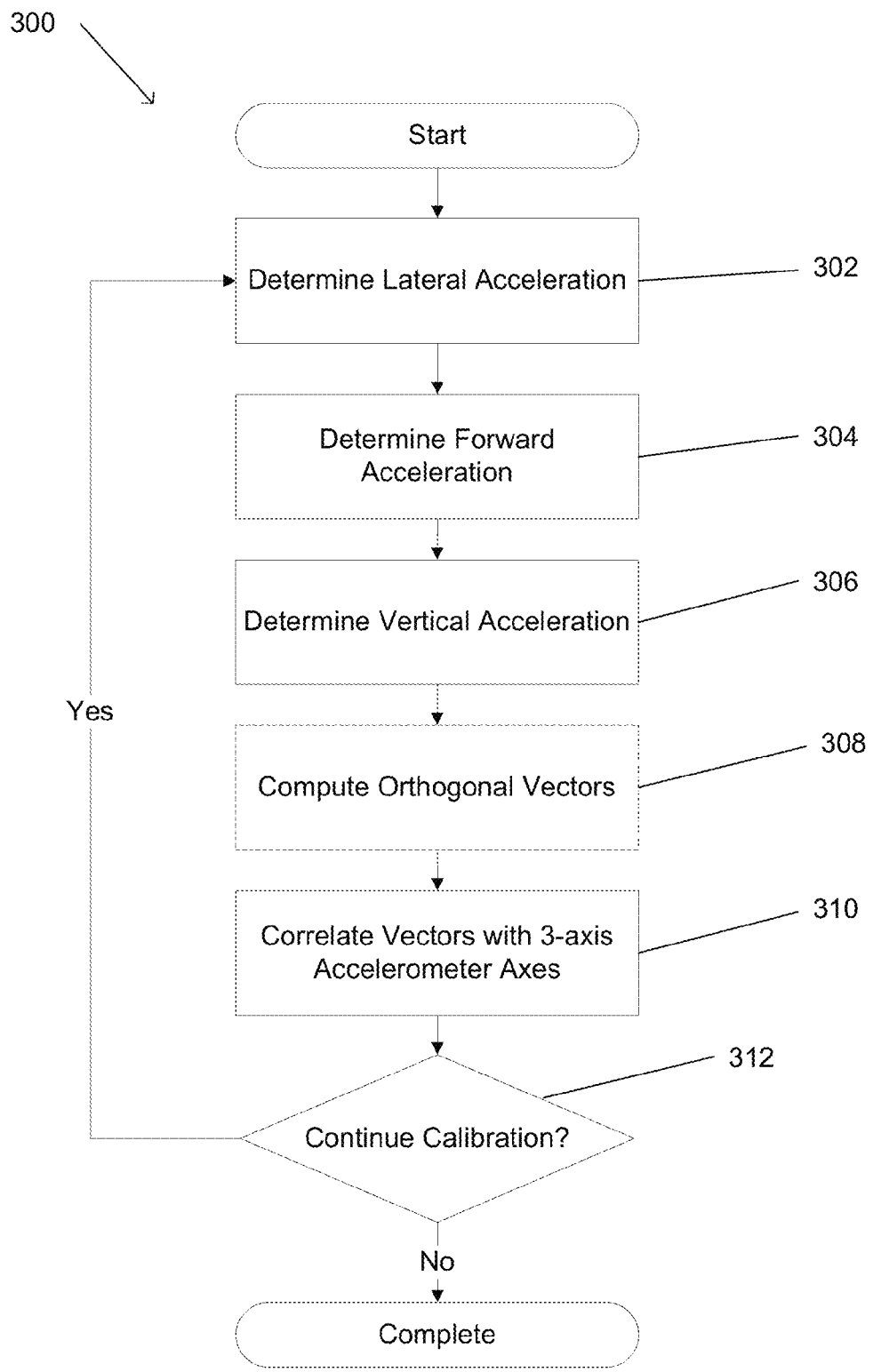
FIG. 3 is a flow chart illustrating a process for calibrating the axes of an accelerometer to the vertical, forward and lateral axes of a vehicle in accordance with an embodiment of the invention.

The location, velocity, and acceleration of a vehicle can be captured using a GPS receiver and utilized to determine the motion of the axes of a vehicle relative to the Earth. This information can be correlated to information measured using a 3-axis accelerometer, thereby calibrating the 3-axis accelerometer to the vehicle. A process for calibrating the axes of a 3-axis accelerometer to the vertical, forward and lateral axes of a vehicle containing both the 3-axis accelerometer and the GPS receiver in accordance with an embodiment of the invention is illustrated in FIG. 3.

The process 300 includes determining (302) lateral acceleration. Forward acceleration is determined (304). Vertical acceleration is determined (306). In several embodiments, orthogonal vectors representing the vertical, forward, and lateral vectors are computed (308). The vertical, forward, and lateral vectors are correlated (310) to the axes of the 3-axis accelerometer. If necessary, the calibration process continues (312) beginning with step 302. If the calibration process does not continue (312), the process ends.

In many embodiments, lateral acceleration is determined (302) using information captured using a 3-axis accelerometer when a GPS receiver indicates that the vehicle is not in motion. In a number of embodiments, forward acceleration is determined (304) using information measured using the 3-axis accelerometer when location information measured using the GPS receiver indicates that the vehicle is in motion. In several embodiments, forward acceleration is determined (304) when a vehicle exceeds a predetermined speed. In several embodiments, vertical acceleration is determined (306) by computing the cross product of the lateral acceleration and forward acceleration. In many embodiments, the orthogonal vectors are computed (308) by calculating the cross product of every combination of the forward acceleration, the lateral acceleration, and the vertical acceleration. In a number of embodiments, calibration continues (312) if the magnitude of the correlation between the 3-axis accelerometer and the vertical, forward, and lateral vectors exceeds a threshold value. In several embodiments, the calibration continues (312) while the vehicle is in motion. In many embodiments, the calibration continues (312) while the vehicle is turned on. In a number of embodiments, the calibration is only performed once and does not continue (312). In a number of embodiments, the calibration process continues (312) when the determined (302, 304, 306) lateral, forward, and/or vertical accelerations exceed a threshold value; the threshold value can be predetermined or determined dynamically. In several embodiments, the calibration process continues (312) until a certain number of successful calibration attempts have been reached. The number of successful calibration attempts can be pre-determined or determined dynamically.

In accordance with many embodiments of the invention, the determined (302, 304, 306) vertical, forward, and/or lateral accelerations are stored in a history buffer. Correlating (310) the vertical, forward, and lateral accelerations with the 3-axis accelerometer axes utilizes the stored vertical, forward, and/or lateral accelerations. In certain embodiments, once a new lateral acceleration is determined (302), correlating (310) the accelerations with the 3-axis accelerometer axes utilizes the lateral acceleration and forward and vertical accelerations stored in the history buffer. Likewise, in several embodiments, once a new forward acceleration is determined (304), calibration (310) utilizes vertical and lateral accelerations stored in the history buffer. In various embodiments, the vertical, forward, and/or lateral accelerations stored in the history buffer are used to predetermine what a vehicle's vertical, forward and lateral axes are and an accelerometer's axes system are calibrated to fit the predetermined vehicle axes. In many embodiments, the vertical, forward, and/or lateral accelerations stored in the history buffer correlate to GPS acceleration samples taken using the GPS receiver and/or accelerometer acceleration samples taken using the 3-axis accelerometer.

In accordance with embodiments of the invention, correlating (310) the vectors corresponding with the axes of the vehicle with the 3-axis accelerometer axes can be performed using a least squares method. Given motion vector samples $[X_i, Y_i, Z_i]$, where i is the number of motion vector samples, vertical alignment vector $[V_x, V_y, V_z]$, forward GPS acceleration sample $F_i$ and lateral GPS acceleration sample $L_i$ and vertical acceleration $$V_i = \sqrt{X_i^2 + Y_i^2 + Z_i^2 - F_i^2 - L_i^2}$$

the alignment vectors that calibrate the axes of the 3-axis accelerometer to the axes of the vehicle are calculated by:

$$B_1 = A_{11} * V_x + A_{12} * V_y + A_{13} * V_z$$

$$B_1 = A_{12} * V_x + A_{22} * V_y + A_{23} * V_z$$

$$B_1 = A_{13} * V_x + A_{23} * V_y + A_{33} * V_z$$

where $$A_{11} = \Sigma X_i^2$$

$$A_{12} = \Sigma X_i * Y_i$$

$$A_{13} = \Sigma X_i * Z_i$$

$$A_{22} = \Sigma Y_i^2$$

$$A_{23} = \Sigma Y_i * Z_i$$

$$A_{33} = \Sigma Z_i^2$$

$$B_1 = \Sigma V_i * X_i$$

$$B_2 = \Sigma V_i * Y_i$$

$$B_3 = \Sigma V_i * Z_i$$

In accordance with embodiments of the invention, the vertical alignment vector $[V_x, V_y, V_z]$ is determined using a Gaussian elimination process. For example, $$V_z = \frac{D_2 * C_{11} - D_1 * C_{12}}{C_{11} * C_{22} - C_{12}^2}$$

$$V_y = \frac{D_1 * C_{22} - D_2 * C_{12}}{C_{11} * C_{22} - C_{12}^2}$$

and $V_L$ is the maximum of $$V_x = \frac{B_1 - A_{12} * V_y - A_{13} * V_z}{A_{11}}$$

$$V_x = \frac{B_2 - A_{22} * V_y - A_{23} * V_z}{A_{12}}$$

$$V_x = \frac{B_3 - A_{23} * V_y - A_{33} * V_z}{A_{13}}$$

-continued where $$C_{11} = A_{11} * A_{22} - A_{12}^2$$

$$C_{12} = A_{11} * A_{22} - A_{12} * A_{13}$$

$$C_{22} = A_{11} * A_{33} - A_{13}^2$$

$$D_1 = B_2 * A_{11} - B_1 * A_{12}$$

$$D_2 \sum B_3 * A_{11} - B_1 * A_{13}$$

Although a specific process for calibrating the axes of a 3-axis accelerometer to the axes of a vehicle is discussed above with respect to FIG. 3, any of a variety of processes, including those which obtain information related to the location, velocity, and/or acceleration of a vehicle using devices other than GPS receivers, can be performed in accordance with embodiments of the invention. In particular, embodiments that determine an average vertical vector that compensates for errors in the measured vertical vectors and use the average vertical vector to calibrate the axes of a 3-axis accelerometer to the axes of the vehicle are discussed in further detail below. Processes for calibrating the axes of a 3-axis accelerometer in accordance with embodiments of the invention are disclosed below.

Vertical Vector Calibration

Figure 4:
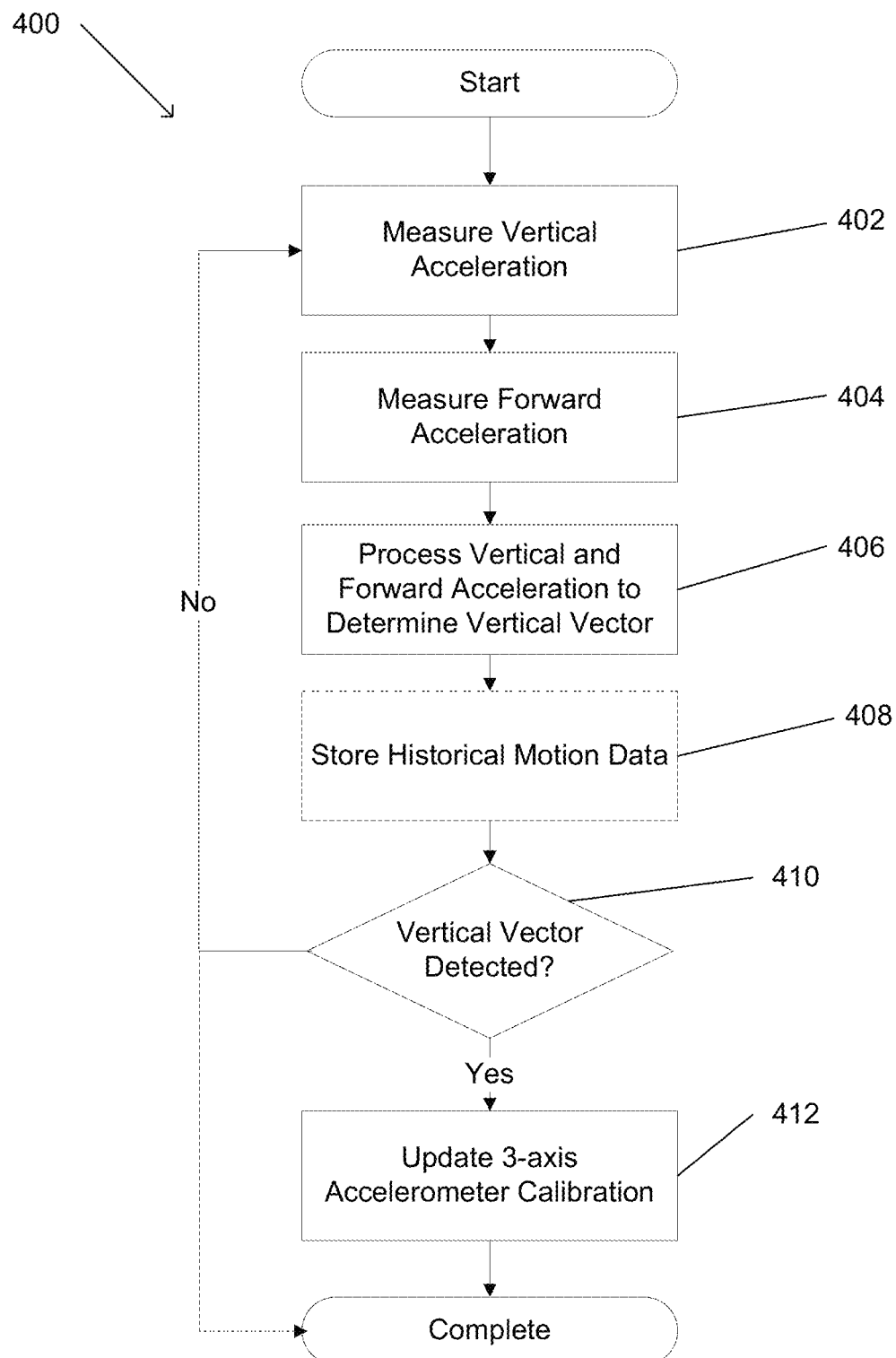
FIG. 4 is a flow chart illustrating a process for calibrating a 3-axis accelerometer along its vertical vector in accordance with an embodiment of the invention.

Filtering the information measured using a 3-axis accelerometer, a GPS receiver, and/or data aligning the 3-axis accelerometer and the GPS receiver can eliminate erroneous data, including, but not limited to, data from a vehicle stopped on an incline. A process for calibrating a vertical vector measured using a 3-axis accelerometer to filter erroneous data in accordance with an embodiment of the invention is illustrated in FIG. 4. The process 400 includes measuring (402) vertical acceleration using a 3-axis accelerometer. The forward acceleration of the 3-axis accelerometer is measured (404). The forward acceleration and the vertical acceleration are processed (406) to determine a vertical vector. In several embodiments, the vertical acceleration and/or the forward acceleration are stored (408) as part or all of the historical motion data. If the vertical vector is detected (410) in the processed (408) vertical and forward accelerations, the 3-axis accelerometer calibration is updated (412) to compensate for the vertical vector. In a number of embodiments, if a vertical vector is not detected (410), the process 400 repeats. In many embodiments, if a vertical vector is not detected (410), the process 400 ends.

In many embodiments, the vertical vector is measured (402) when the speed of the vehicle exceeds a threshold; the threshold can be pre-determined or determined dynamically. In several embodiments, the forward acceleration of the 3-axis accelerometer is measured (404) when the forward acceleration exceeds a threshold acceleration; the threshold acceleration can be pre-determined or determined dynamically. In a number of embodiments, the motion of the vehicle is determined using a GPS receiver. In several embodiments, elevation data measured using the GPS receiver is utilized to determine whether the vehicle is likely stopped on an incline. In many embodiments, determining that the vehicle is at rest using the GPS receiver involves no change in GPS receiver position over time. In a number of embodiments, detecting no GPS receiver movement can involve a determination of whether there is any GPS receiver movement over time that takes consideration of erroneous GPS receiver movement readings. In many embodiments, the motion of the vehicle is determined using the 3-axis accelerometer. In several embodiments, detecting constant acceleration using an accelerometer is made in an event with no movement of a vehicle as detected by a GPS receiver. In several embodiments, the stored (408) historical motion data includes data captured using the GPS receiver and/or 3-axis accelerometer. In certain embodiments, only a selection of data is stored (408) as historical motion data, such as data that corresponds to certain events of interest. In a number of embodiments, all data captured using the GPS receiver and/or 3-axis accelerometer is stored (408) as historical motion data.

For example, when the GPS receiver indicates that a vehicle is stationary and the 3-axis accelerometer experiences constant acceleration, an assumption can be made that the vehicle is stationary and that the 3-axis accelerometer output is indicative of vertical acceleration due to gravity. When both the 3-axis accelerometer and the GPS receiver indicate vehicle speeds above a certain threshold value and increasing with a constant direction, an assumption can be made that the vehicle is accelerating in approximately a straight line. When a calibration event occurs, the calibration of the 3-axis accelerometer is updated (412) utilizing the determined (406) vertical vector to compensate for the vertical acceleration due to gravity as measured by the 3-axis accelerometer.

In numerous embodiments, the processing (406) of current motion data includes analysis and filtering of data to provide data veracity. In several embodiments, current measured (402, 404) vertical and forward accelerations are processed (406) using historical motion data. Data analysis can utilize filters, including least mean squares, least squares, and Gaussian elimination methods, including those described above with respect to FIG. 3.

Although specific processes are discussed above for calibrating a 3-axis accelerometer to compensate for acceleration along its vertical vector, any of a variety of processes can be utilized, including processes that operate on vehicles that are in motion, in accordance with embodiments of the invention. In particular, alternative techniques for calibrating a 3-axis accelerometer that utilize vertical sample buffers to compensate for measurement errors in the vertical vector are discussed in more detail below with respect to FIG. 8. Processes for calibrating a 3-axis accelerometer along its forward vector in accordance with embodiments of the invention are described below.

Lateral Vector Calibration

Figure 5:
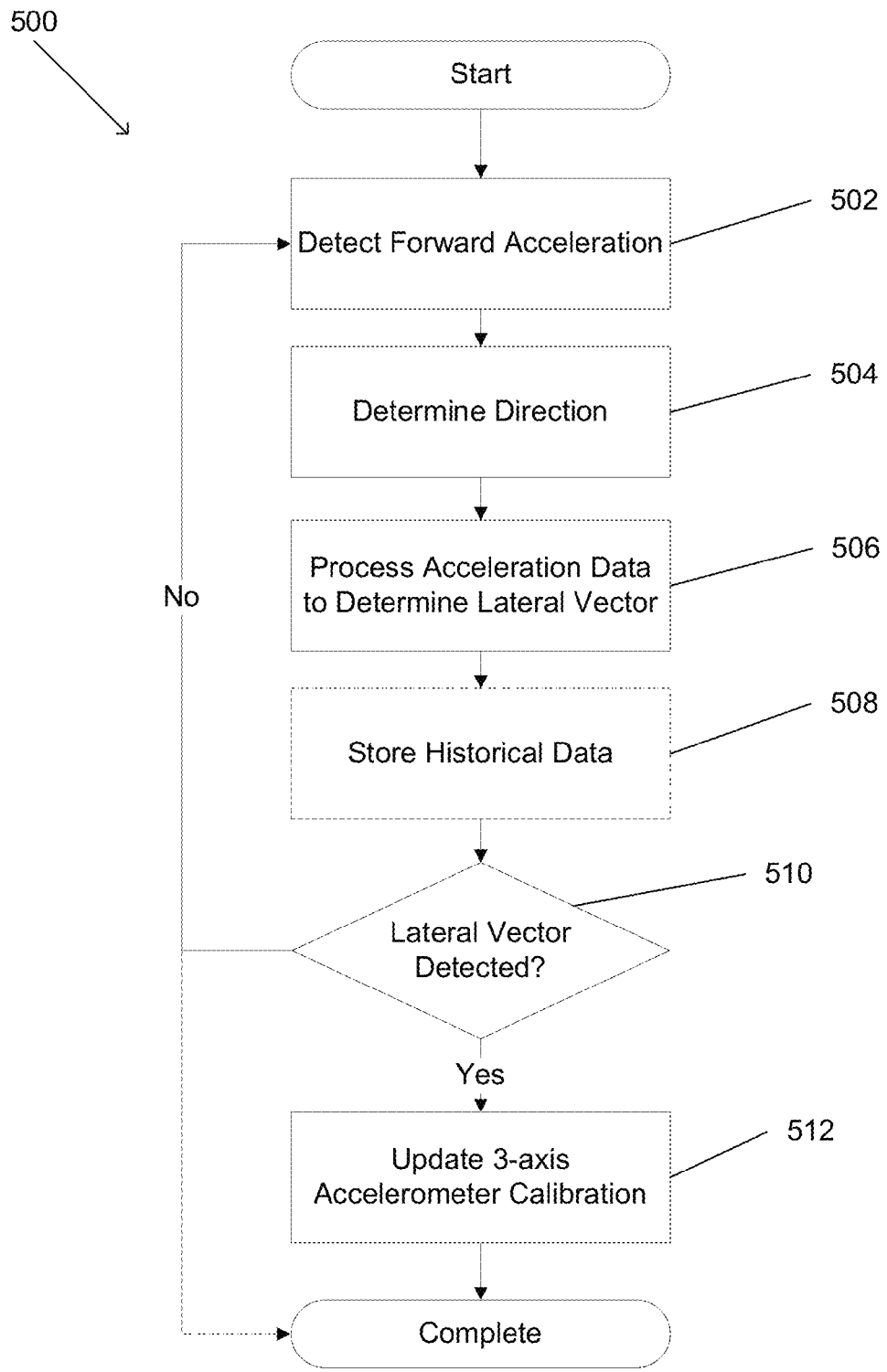
FIG. 5 is a flow chart illustrating a process for calibrating a 3-axis accelerometer along its lateral vector in accordance with an embodiment of the invention.

Filtering the lateral vector measured by a 3-axis accelerometer allows a telematics unit to compensate for measurement errors, including measurements made when a vehicle is moving backwards or turning very slightly. A process for calibrating a 3-axis accelerometer along its lateral axis in accordance with an embodiment of the invention is illustrated in FIG. 5. The process 500 includes detecting (502) data related to the forward acceleration of a vehicle. The direction of the acceleration is determined (504). The acceleration data is processed (506) to determine a lateral vector. In a number of embodiments, the acceleration data is stored (508) as part of all of the historical motion data. If a lateral vector is detected (510), the calibration of the 3-axis accelerometer is updated (512) using the lateral vector. In many embodiments, if no lateral vector is detected (510), the process 500 repeats. In several embodiments, if no lateral vector is detected (510), the process 500 is complete.

In many embodiments, detecting (502) data related to the forward acceleration of a vehicle includes determining that the velocity of the vehicle exceeds a threshold velocity. In several embodiments, the velocity of the vehicle can be detected (502) using a GPS receiver and/or a 3-axis accelerometer. The GPS receiver and/or 3-axis accelerometer can also be utilized to determine (504) the direction in which the vehicle is traveling. In a number of embodiments, the vehicle is traveling in a constant direction. Analysis of data received using a GPS receiver can determine (504) whether the direction of motion is unchanging by comparing current values to past values. Similarly, analysis of data received using a 3-axis accelerometer can determine (504) whether the direction of acceleration is unchanging by comparing current acceleration to past values for any changes in acceleration direction. Certain embodiments only use a GPS receiver or only use a 3-axis accelerometer to determine (504) constant direction; other embodiments use both a GPS receiver and a 3-axis accelerometer to determine (504) a constant direction. Several embodiments use a GPS receiver to check data received using a 3-axis accelerometer or vice versa. In various embodiments, a constant direction is not one in which data indicates the direction data is rigidly constant, but takes into account errors and discrepancies that can come from erroneous direction data, such as an inaccurate GPS reading or measurement errors in a 3-axis accelerometer.

Analysis of data can be used to determine whether the data is indicative of a lateral vector. Indications of a lateral vector can filter out data that is likely an outlier, such as data indicating that a vehicle is moving backward rather than forward. This can include filtering out events indicating that a vehicle is slowly backing out of a parking spot before turning and driving in a forward direction. Data analysis can utilize filters, including, but not limited to, least mean squares, least squares, and Gaussian elimination methods, including those described above with respect to FIG. 3.

A specific process is described above with respect to FIG. 5 for calibrating the forward axis of a 3-axis accelerometer with respect to a lateral vector; however, any of a variety of processes can be utilized, including processes that do not rely upon uniform forward motion of the vehicle, in accordance with an embodiment of the invention. Processes for calibrating a 3-axis accelerometer using an average forward vector in accordance with embodiments of the invention are discussed below.

3-Axis Accelerometer Calibration Using an Average Forward Vector

Figure 6:
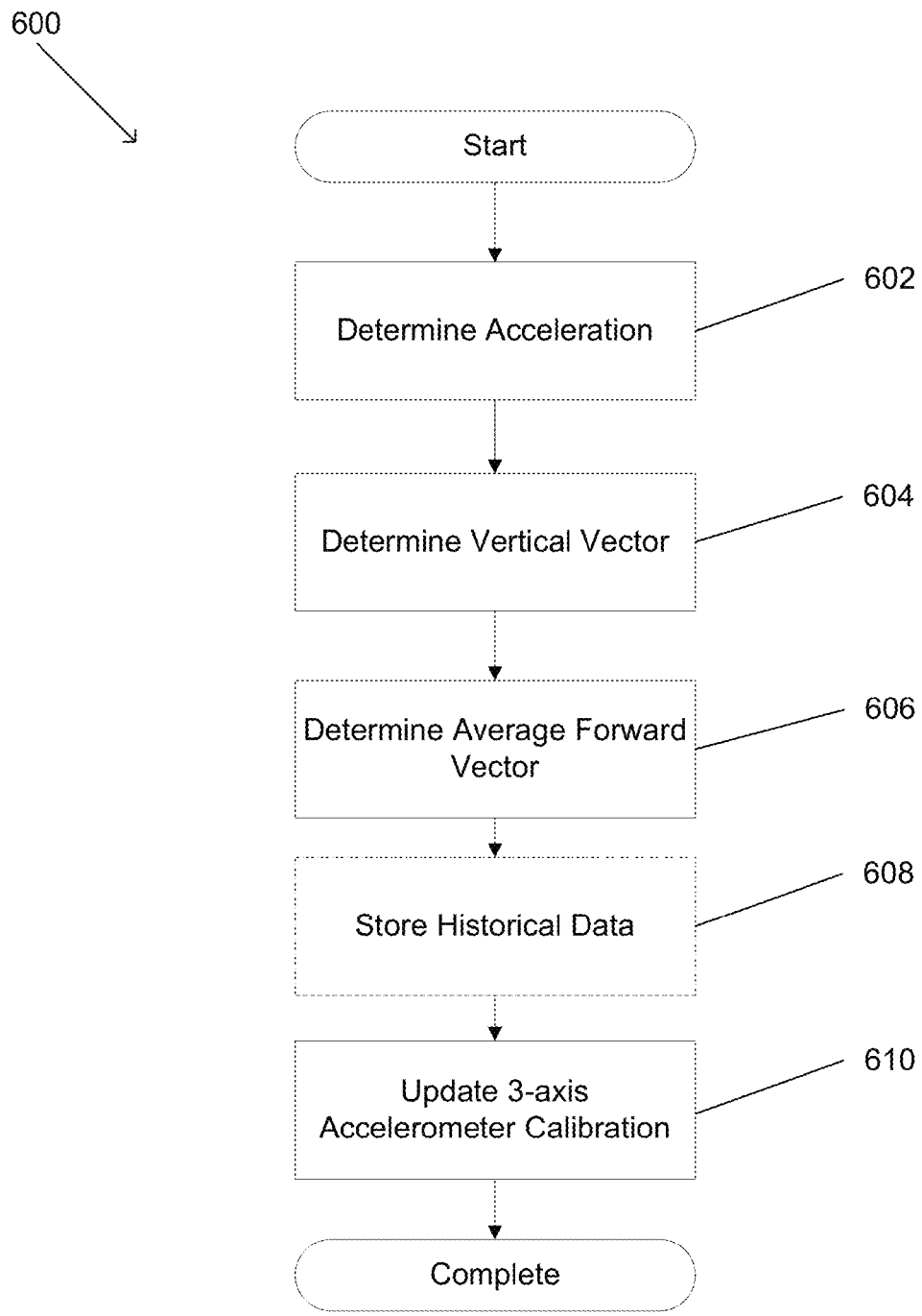
FIG. 6 is a flow chart illustrating a process for determining an average forward vector used in the calibration of 3-axis accelerometer in accordance with an embodiment of the invention.

Once a vertical vector and/or a lateral vector have been determined, an average forward vector can be computed; this average forward vector is used to calibrate the forward acceleration measured using a 3-axis accelerometer to the forward motion of the vehicle in which the 3-axis accelerometer is mounted. A process for determining an average forward vector used to calibrate a 3-axis accelerometer in accordance with en embodiment of the invention is illustrated in FIG. 6. The process 600 includes determining (602) acceleration information. A vertical vector is determined (604). An average forward vector is determined (606). In many embodiments, the vertical, lateral, and/or average forward vectors are stored (608) as historical data. The calibration of a 3-axis accelerometer is updated (610).

In many embodiments, acceleration information is determined (602) utilizing a GPS receiver and/or a 3-axis accelerometer. In many embodiments, the vertical vector is determined (604) using a process similar to the one described above with respect to FIG. 4. In a number of embodiments, determining (604) the vertical vector includes multiplying a normalized vertical vector by acceleration information stored as historical data. In several embodiments, determining (606) the average forward vector includes determining a lateral vector using a process similar to the one described above with respect to FIG. 5. In many embodiments, determining the lateral vector includes subtracting the determined (604) vertical vector from the determined (602) acceleration information. The vertical vector and/or acceleration information used to determine the lateral vector can be stored (608) as historical data. In a number of embodiments, determining (606) the average forward vector utilizes the lateral vector and the angle between the lateral vector and a measured forward vector. In several embodiments, the measured forward vector is determined using forward acceleration information captured using a 3-axis accelerometer. In many embodiments, the measured forward vector is a previously calculated average forward vectored stored as historical data. In a number of embodiments, determining (606) the average forward vector uses one or both of the determined (602) acceleration and the determined (604) vertical vector. In many embodiments, a certain amount of acceleration information and/or a certain number of vertical vectors and/or average forward vectors are stored (608) as historical data before the 3-axis accelerometer calibration is updated (610). The amount of acceleration information and/or number of vectors stored can be determined dynamically and/or pre-determined.

A specific process is described above with respect to FIG. 6 for calibrating a 3-axis accelerometer using a determined average forward vector; however, any of a variety of processes, including those which utilize an average lateral vector and those which determine a lateral vector, can be utilized in accordance with an embodiment of the invention. Processes for calculating aligned forward, lateral, and vertical accelerations in accordance with embodiments of the invention are discussed further below.

Low Latency 3-Axis Accelerometer Calibration

Figure 7:
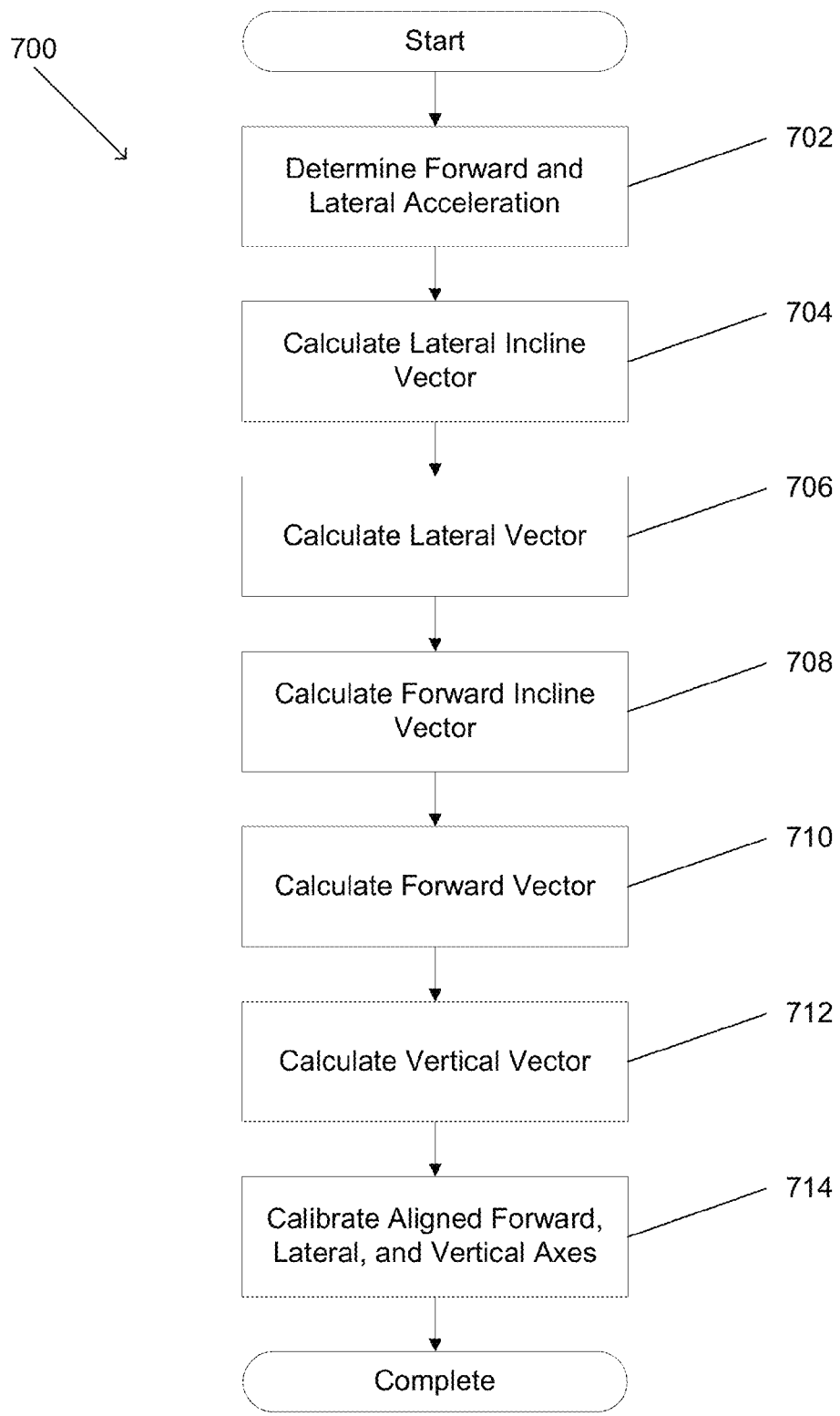
FIG. 7 is a flow chart illustrating a process for the low latency calibration of a 3-axis accelerometer in accordance with an embodiment of the invention.

During the operation of a vehicle, drivers benefit from receiving warning and alerts as quickly as possible so corrective action can be taken. Many of these alerts depend upon acceleration information measured using 3-axis accelerometers. By performing a low latency alignment of a 3-axis accelerometer, acceleration information can be provided quickly, enabling warnings and alerts to be generated with short delays. Telematics units in accordance with embodiments are configured to determine lateral incline vectors and forward incline vectors using measured acceleration information; these vectors can be utilized to determine alignment information in a low latency fashion. A process for low latency acceleration alignment in accordance with an embodiment of the invention is shown in FIG. 7. The process 700 includes measuring (702) forward and lateral acceleration. A lateral incline vector is calculated (704). A lateral vector is calculated (706). A forward incline vector is calculated (708). A forward vector is calculated (710). A vertical vector is calculated (712). Acceleration axes are calibrated (714).

In a variety of embodiments, measuring (702) forward and/or lateral acceleration is performed using a GPS receiver and/or 3-axis accelerometer. In several embodiments, measuring (702) forward and/or lateral acceleration is performed using processes similar to those described above. In many embodiments, a lateral incline vector ($A_{lat\text{-}incline}$) can be calculated (704) such that:

$$A_{lat\text{-}incline} = A_{mems} - L_{gps} * \text{Norm}(F_{calb} \times A_{mems})$$

where $A_{mems}$ is a vector representing the acceleration data typically provided by a 3-axis accelerometer, $F_{calb}$ is the calibrated forward vector, and $L_{gps}$ is the lateral acceleration of a vehicle. In a number of embodiments, $L_{gps}$ is determined using a GPS receiver. In several embodiments, $A_{lat\text{-}incline}$ is calculated by determining the accelerometer acceleration vector ($A_{mems}$) and forward vector ($F_{calb}$) and computing the cross product of the two vectors. In a variety of embodiments, the resulting vector is normalized.

In several embodiments, a lateral vector ($A_{lat}$) can be calculated (706) using the formula:

$$A_{lat} = \text{Norm}(F_{calb} \times A_{lat\text{-}incline})$$

where $F_{calb}$ is the calibrated forward vector and $A_{lat\text{-}incline}$ is the lateral incline vector.

In a similar fashion, in several embodiments of the invention, a forward incline vector ($A_{forw\text{-}incline}$) can be calculated (708) such that:

$$A_{forw\text{-}incline} = A_{mems} - F_{gps} * \text{Norm}(A_{lat\text{-}incline} \times A_{lat})$$

where $A_{lat\text{-}incline}$ is the lateral incline vector, $A_{lat}$ is the lateral vector, $F_{gps}$ is the measured forward acceleration, and $A_{mems}$ is the acceleration vector. In a variety of embodiments, ($A_{lat\text{-}incline} \times A_{lat}$) is normalized.

In many embodiments, the forward vector ($A_{forw}$) can be calculated (710) such that:

$$A_{forw} = \text{Norm}(A_{forw\text{-}incline} \times A_{lat})$$

where $A_{forw\text{-}incline}$ is the forward incline vector and ($A_{lat}$) the lateral vector. In a variety of embodiments ($A_{forw\text{-}incline} \times A_{lat}$) is normalized to determine the forward vector ($A_{forw}$). Once the lateral and forward vectors are calculated, the vertical vector ($A_{vert}$) may be calculated (712) such that:

$$A_{vert} = \text{Norm}(A_{lat} \times A_{forw})$$

where $A_{lat}$ is the lateral vector and $A_{forw}$ is the forward vector. In a variety of embodiments ($A_{lat} \times A_{forw}$) is normalized to determine the vertical vector ($A_{vert}$).

In a variety of embodiments, the axes of the 3-axis accelerometer are calibrated (714) to the axes of the vehicle using the aligned (706, 710, 712) forward, lateral, and vertical vectors. In several embodiments of the invention, the aligned lateral vector ($A_{lat}$), forward vector ($A_{forw}$), and vertical vector ($A_{vert}$), are used to calibrate (714) the aligned lateral, forward, and vertical axes such that:

Aligned Lateral Axis=$A_{lat} * A_{mems}$

Aligned Forward Axis=$A_{forw} * A_{mems}$

Aligned Vertical Axis=$A_{vert} * A_{mems}$

As discussed above, the acceleration information utilized above is obtained from 3-axis accelerometers and GPS receivers at a sampling rate related to the device providing the information. In many embodiments, the determination of the lateral incline vector and the forward incline vector utilizes fewer samples (a variety of embodiments utilize half the number of samples) than accumulating information from the 3-axis accelerometer and the GPS receiver and directly calculating the calibration information for the forward, lateral, and vertical axes of the 3-axis accelerometer and the vehicle using the accumulated samples while maintaining equivalent performance in the calibration. By utilizing fewer samples to determine the alignment information used to calibrate the 3-axis accelerometer to the vehicle axes, telematics systems utilizing lateral incline vectors and forward incline vectors in the calibration as described above exhibit low latency in the calibration of the 3-axis accelerometer to the vehicle axes.

Although specific processes for the low latency calculation of the aligned lateral, forward, and vertical accelerations are discussed above with respect to FIG. 7, any of a variety of processes, including those utilizing alternative methods for determining accelerations other than GPS receivers and 3-axis accelerometers, can be utilized in accordance with embodiments of the invention. Processes for alignment methods utilizing vertical sample buffers in accordance with embodiments of the invention are discussed further below.

Acceleration Alignment with Vertical Sample Buffers

Figure 8:
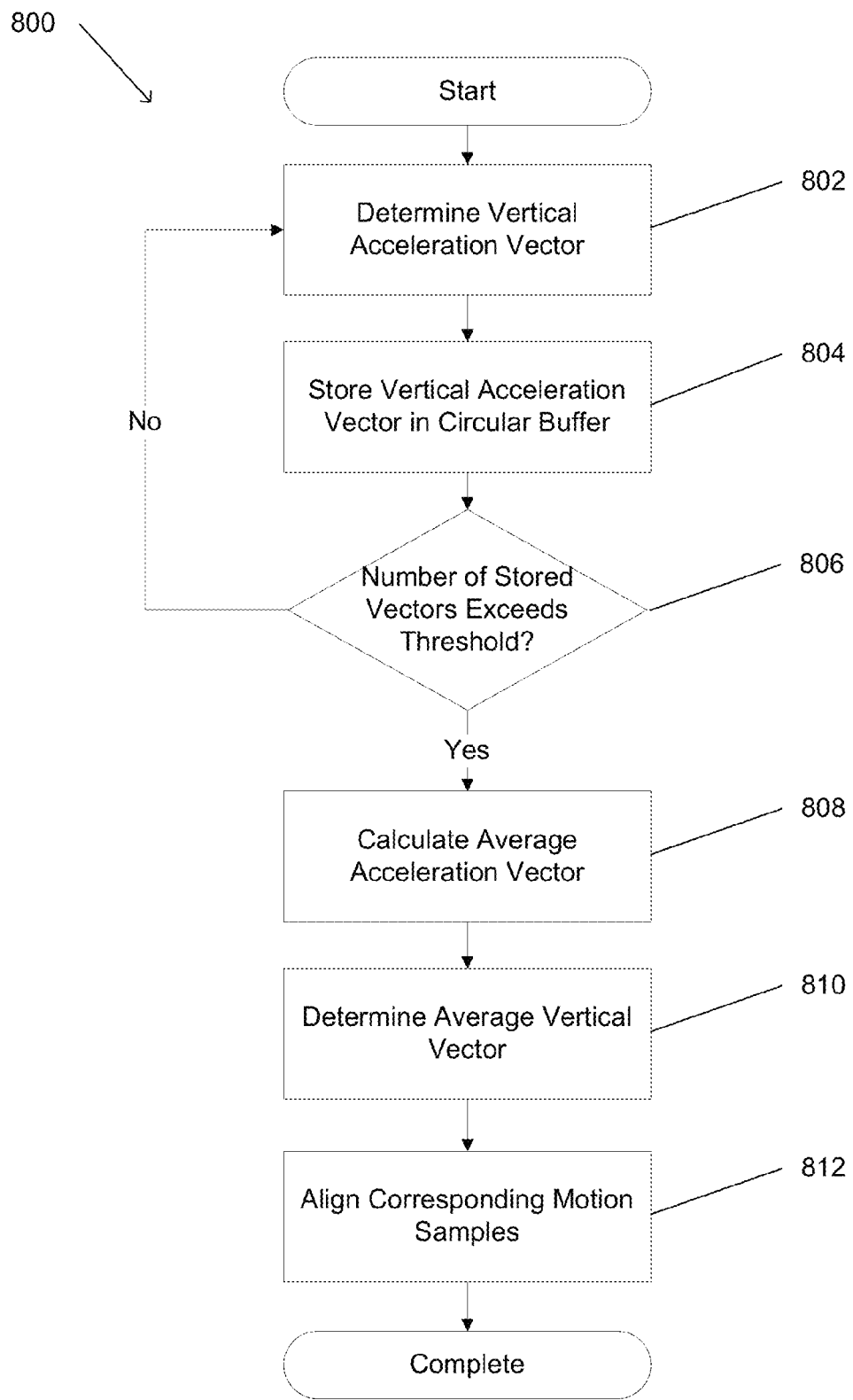
FIG. 8 is a flow chart illustrating a process for the calibration of a 3-axis accelerometer with vertical sample buffers in accordance with an embodiment of the invention.

Information determined via a GPS receiver can include measurement errors unique to each sample of information obtained; these errors induce additional noise and errors in the calibration of 3-axis accelerometers using the GPS-determined acceleration data. Telematics units in accordance with embodiments of the invention are configured to utilize vertical sample buffers to determine an average vertical vector that compensates for the measurement errors in the samples obtained from the GPS receiver. A process for utilizing vertical vector stabilization in the calibration of 3-axis accelerometers in accordance with an embodiment of the invention is shown in FIG. 8. The process 800 includes determining (802) vertical acceleration vectors. One or more vertical acceleration vectors are stored (804). If the number of stored vectors does not exceed (806) a threshold value, more vertical acceleration vectors are determined (802). If the number of stored vectors exceeds (806) a threshold value, an average acceleration vector is calculated (808). The threshold value can be determined dynamically and/or be predetermined. The average acceleration vector is processed. An average vertical vector (810) is determined. Corresponding motion samples are aligned (812).

In a variety of embodiments, determining (802) vertical acceleration vectors is performed using processes similar to those described above. In a number of embodiments, the determined (802) vertical acceleration vectors are measured using a GPS receiver. In several embodiments, the determined (802) vertical acceleration vectors are stored (804) using a vertical sample buffer. In many embodiments, the vertical sample buffer is a circular buffer; circular buffers in accordance with embodiments of the invention are configured to store a number of vertical acceleration vectors. Once the circular buffer has reached its capacity, the oldest vector is dropped (or overwritten) and a new vertical acceleration vector takes its place. In several embodiments, the vertical sample buffer is configured to associate metadata including, but not limited to a timestamp, with a particular vertical acceleration vector. Once the vertical sample buffer has reached its capacity, the metadata is utilized to determine which vertical acceleration vector is dropped (or overwritten). The capacity of the vertical acceleration buffer can be predetermined and/or determined dynamically. Other buffers and buffering techniques can be utilized according to the requirements of embodiments of the invention.

In many embodiments, the average acceleration vector is calculated (808) by accumulating the previous calculated vertical vectors and updating the average using each newly calculated vector utilizing a counter. In several embodiments, the stored vertical acceleration vectors are determined during different periods of time and include varying measurement errors. In a variety of embodiments, determining (810) an average vertical vector includes calculating a moving average using the stored (804) vertical acceleration vectors. In a number of embodiments, an average of the stored (804) vertical acceleration vectors is used to determine (810) the average vertical vector. The number stored (804) vertical acceleration vectors utilized to determine (810) the average vertical vector can be all of the stored (804) vectors or a portion of the stored (804) vectors. In a number of embodiments, the determined (810) average vertical vector is used to align (812) the corresponding motion samples by determining forward and lateral vectors using methods including, but not limited to, those discussed above. Utilizing the determined (810) average vertical vector, errors in the measurement of the vertical vectors are limited and aid in the accurate alignment (812) of the corresponding motion samples.

Although specific processes for performing acceleration alignment using vertical sample buffers are discussed above with respect to FIG. 8, any of a variety of processes appropriate to the requirements of a specific application can be utilized in accordance with embodiments of the invention.

Although the present invention has been described in certain specific aspects, many additional modifications and variations would be apparent to those skilled in the art. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A telematics system, comprising:
   a processor;
   an acceleration sensor connected to the processor determining acceleration information along a set of acceleration sensor axes comprising a first accelerometer axis;
   a velocity sensor connected to the processor and determining velocity information along axes of a vehicle and heading information, where the axes of a vehicle comprise a vehicular forward axis, a vehicular lateral axis, and a vehicular vertical axis and a memory connected to the processor and storing an acceleration alignment application and a vertical sample buffer, where the vertical sample buffer stores a number of vertical vector samples;
   wherein the acceleration alignment application directs the processor to:
      receive a velocity information sample using the velocity sensor;
      determine vehicular acceleration information along at least one vehicle axes using the velocity information sample;
      receive at least one acceleration sensor acceleration information sample using the acceleration sensor;
      determine a plurality of vertical vector samples using the vehicular acceleration information;
      store at least one of the determined plurality of vertical vector samples using the vertical sample buffer;
      calculate an average vertical vector sample using at least one of the stored vertical vector samples; and
      calibrate the first acceleration axis to the vehicular forward axis using the vehicular acceleration information, the at least one acceleration sensor acceleration sample, and the average vertical vector sample by computing orthogonal vectors based on the cross product of every combination of the acceleration sensor acceleration information along the vehicular forward axis, the vehicular lateral axis, and the vehicular vertical axis, thereby calibrating the orientation of the accelerometer so that the first accelerometer axis corresponds to the vehicular forward axis.

2. The telematics system of claim 1, wherein the vertical sample buffer is a circular buffer stores a fixed number of vertical vector samples.

3. The telematics system of claim 2, wherein the acceleration alignment application further directs the processor to replace the oldest vertical vector sample stored in the vertical sample buffer once the fixed number of vertical vector samples have been stored using the vertical sample buffer.

4. The telematics system of claim 3, wherein the acceleration alignment application further directs the processor to associate a vector sample metadata with a vector sample, where the vector sample metadata includes a timestamp.

5. The telematics system of claim 3, wherein the acceleration alignment application further directs the processor to:
associate axis calibration metadata with the at least one calibrated axes; and
recalibrate the calibrated vehicles axes using the acceleration sensor acceleration information samples, the vehicular acceleration sample, the stored at least one vertical vector sample, the vector sample metadata, and the axis calibration metadata.

6. The telematics system of claim 1, wherein:
the velocity sensor is a Global Positioning System (GPS) receiver having a GPS sampling rate;
the velocity information determined using the GPS receiver is determined at the GPS sampling rate;
each piece of velocity information determined using the GPS receiver has an associated velocity information error, where the velocity information error is a measure of the difference between the determined velocity information and the true velocity information; and
the acceleration alignment application further directs the processor to calculate the average vertical vector sample to compensate for the velocity information errors.

7. The telematics system of claim 1, wherein the acceleration alignment application further directs the processor to calculate the average vertical vector sample once a number of vertical vector samples have been stored in the buffer.

8. The telematics system of claim 7, wherein the number of vertical vector samples is determined based on performance requirements of the telematics system.

9. The telematics system of claim 8, wherein:
the velocity sensor determines velocity information at a velocity sensor sample rate;
the performance requirements of the telematics system are based on a delay between the motion of the telematics system and the time the calibration of at least one of the vehicle axes to an acceleration sensor axis in the at least one acceleration sensor axes is completed; and
the number of vertical vector samples utilized to determine the average vertical vector is based on the velocity sensor sample rate and the delay.

10. The telematics system of claim 1, wherein the acceleration alignment application further directs the processor to:
determine an updated average vertical acceleration vector using the stored vertical vectors and the calibrated vehicle axes; and
recalibrate the calibrated vehicles axes using the using the acceleration sensor acceleration information samples, the vehicular acceleration sample, and the updated average vertical acceleration vector.

11. A method for aligning a vehicle's axes using a telematics system mounted in a vehicle having at least one vehicle axes, comprising:
receiving at least one velocity information sample using a telematics system;
determining vehicular acceleration information along at least one vehicle axis using velocity information sample and the telematics system, where the at least one vehicle axes comprises a vehicular forward axis, a vehicular lateral axis, and a vehicular vertical axis;
receiving at least one acceleration sensor acceleration information sample using the telematics system;
determining a plurality of vertical vector samples using the vehicular acceleration information and the telematics system;
storing at least one of the determined plurality of vertical vector samples using the telematics system;
calculating an average vertical vector sample using at least one of the stored vertical vector samples and the telematics system; and
calibrating a first acceleration axis to the vehicular forward axis based on the vehicular acceleration information, the at least one acceleration sensor acceleration sample, the average vertical vector sample by computing orthogonal vectors based on the cross product of every combination of the acceleration sensor acceleration information along the vehicular forward axis, the vehicular lateral axis, and the vehicular vertical axis, thereby calibrating the orientation of the accelerometer so that the first accelerometer axis corresponds to the vehicular forward axis using the telematics system.

12. The method of claim 11, wherein the telematics system stores a fixed number of vertical vector samples.

13. The method of claim 12, further comprising replacing the oldest stored vertical vector sample once the fixed number of vertical vector samples has been stored using the telematics system.

14. The method of claim 13, further comprising associating vector sample metadata with a vertical vector sample using the telematics system, where the vector sample metadata comprises a timestamp.

15. The method of claim 13, further comprising:
associating axis calibration metadata with the at least one calibrated axes using the telematics system; and
recalibrating the calibrated vehicles axes based on the acceleration sensor acceleration information samples, the vehicular acceleration sample, the stored at least one vertical vector sample, the vector sample metadata, and the axis calibration metadata using the telematics system.

16. The method of claim 11, wherein:
the telematics unit includes a Global Positioning System (GPS) receiver having a GPS sampling rate;
the velocity information determined using the telematics system is determined at the GPS sampling rate;
each piece of velocity information determined using the telematics system has an associated velocity information error, where the velocity information error is a measure of the difference between the determined velocity information and the true velocity information; and
calculating the average vertical vector sample using the telematics system compensating for the velocity information errors.

17. The method of claim 11, further comprising calculating the average vertical vector sample using the telematics system once a number of vertical vector samples have been stored.

18. The method of claim 17, wherein the number of vertical vector samples is determined based on performance requirements of the telematics system.

19. The method of claim 18, further comprising calculating the number of vertical vector samples utilized in determining the average vertical vector based on a velocity sensor sample rate using the telematics system.

20. The method of claim 11, further comprising:
   determining an updated average vertical acceleration vector based on the stored vertical vectors and the calibrated vehicle axes using the telematics system; and
   recalibrating the calibrated vehicles axes based on the acceleration sensor information samples, the vehicular acceleration sample, and the updated average vertical acceleration vector using the telematics system.

* * * * *